US 7,518,255 B2

(12) United States Patent
Gordon

(10) Patent No.: US 7,518,255 B2
(45) Date of Patent: Apr. 14, 2009

(54) ROOF MOUNTED WIND TURBINE

(75) Inventor: David Hyman Gordon, Glasgow (GB)

(73) Assignee: Windsave Holdings plc, Glasgow (GB)

( * ) Notice: Subject to any disclaimer, the term of this patent is extended or adjusted under 35 U.S.C. 154(b) by 0 days.

(21) Appl. No.: 10/503,565

(22) PCT Filed: Feb. 3, 2003

(86) PCT No.: PCT/GB03/00442

§ 371 (c)(1),
(2), (4) Date: Mar. 18, 2005

(87) PCT Pub. No.: WO03/067081

PCT Pub. Date: Aug. 14, 2003

(65) Prior Publication Data

US 2005/0180851 A1 Aug. 18, 2005

(30) Foreign Application Priority Data

Feb. 2, 2002 (GB) ................................. 0202435.4

(51) Int. Cl.
 *F03D 9/00* (2006.01)
 *H02P 9/00* (2006.01)
(52) U.S. Cl. .......................... 290/44; 290/55
(58) Field of Classification Search .................. 290/43, 290/44, 54, 55; 310/216, 156; 415/2, 3; 416/197
See application file for complete search history.

(56) References Cited

U.S. PATENT DOCUMENTS

| 3,956,902 | A | * | 5/1976 | Fields, Jr. ..................... 62/3.3 |
| 4,084,102 | A | | 4/1978 | Fry |
| 4,088,352 | A | | 5/1978 | Kling |
| 4,379,972 | A | * | 4/1983 | Sosa et al. ..................... 290/44 |
| 4,398,096 | A | * | 8/1983 | Faurholtz ..................... 290/55 |
| 4,421,967 | A | * | 12/1983 | Birgel et al. ................. 219/631 |
| 5,289,041 | A | * | 2/1994 | Holley .......................... 290/44 |
| 5,747,909 | A | * | 5/1998 | Syverson et al. ....... 310/156.56 |
| 5,798,632 | A | * | 8/1998 | Muljadi ...................... 322/29 |
| 6,043,565 | A | * | 3/2000 | Les Strange ................. 290/55 |
| 6,097,104 | A | * | 8/2000 | Russell ....................... 290/54 |
| 6,765,309 | B2 | * | 7/2004 | Tallal et al. .................. 290/55 |
| 7,057,323 | B2 | * | 6/2006 | Horst ........................ 310/191 |

FOREIGN PATENT DOCUMENTS

| DE | 199 19 133 | 11/2000 |
| DE | 201 09 480 | 10/2001 |
| EP | 0 072 598 | 2/1983 |
| EP | 0 265 364 | 4/1988 |
| EP | 1 154 445 | 11/2001 |

OTHER PUBLICATIONS

Erich Hau: "Windkraftenlagen" 1996, Springer Verlag XP 002242483 241430 p. 504, fig 15.25 p. 501-p. 504.
Online US Department of Energy, Feb. 3, 2003 XP 002242484, retrieved from the Internet: <URL: http://www.eere.energy.gov/power/consumer/connect_elec_grid.html, retrieved on May 26, 2003 "Connecting Your System To The Electricity Grid," and subsequent linked pages.

* cited by examiner

*Primary Examiner*—Nicholas Ponomarenko
(74) *Attorney, Agent, or Firm*—Reed Smith LLP; Carl H. Pierce; Joseph Miller, III

(57) ABSTRACT

A system for generating electrical power for an individual property (10) comprises a wind powered electricity generator (16) mounted on that property and arranged so that the electrical power generated be used in that property in preference to or to supplement electrical power provided by the national grid or other general electrical energy source.

10 Claims, 6 Drawing Sheets

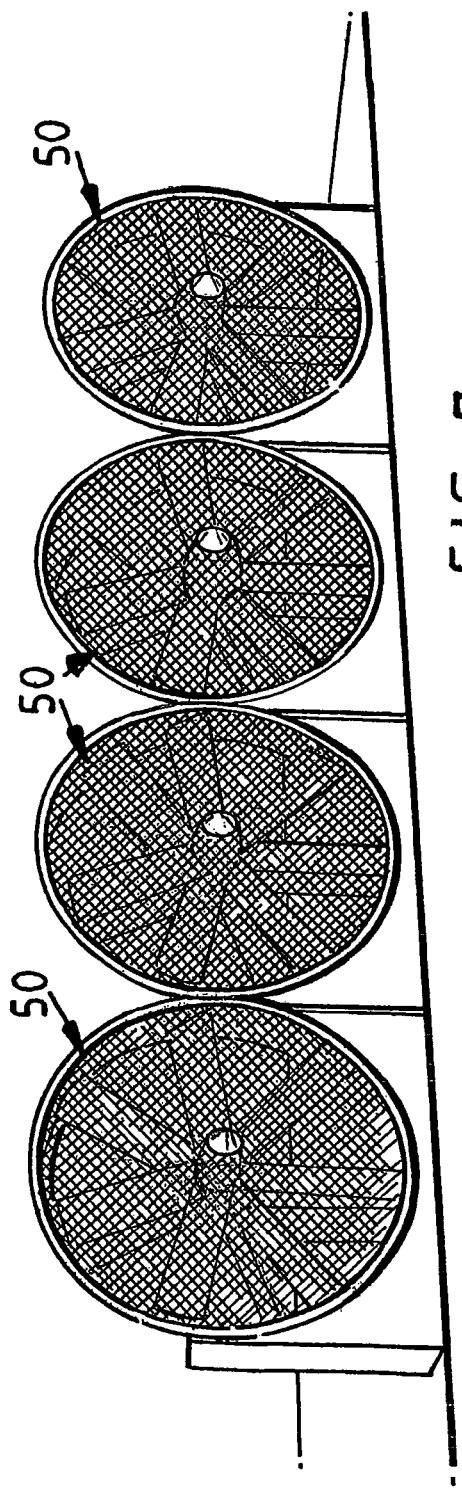
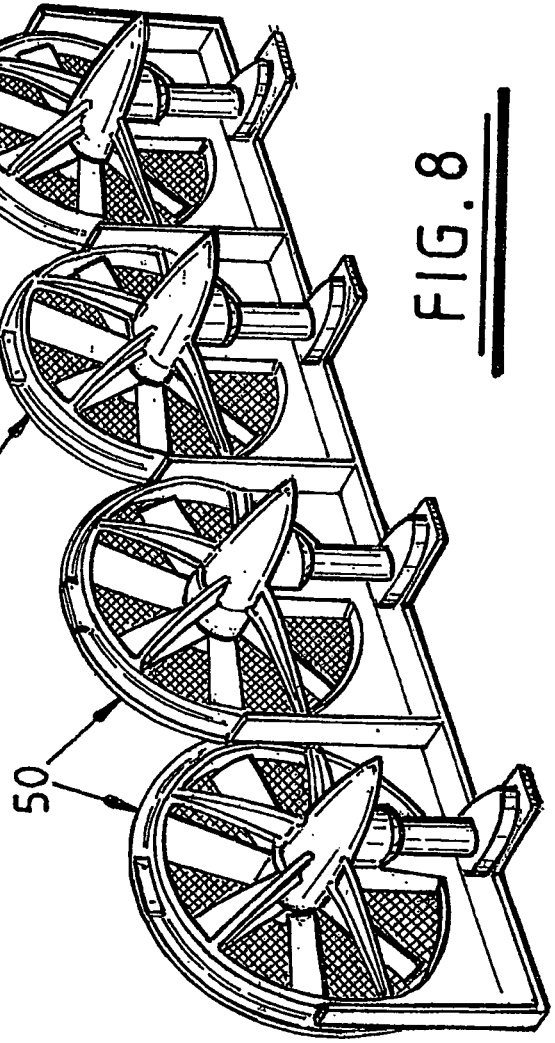
FIG. 7
FIG. 8

ROOF MOUNTED WIND TURBINE

CROSS-REFERENCE TO RELATED APPLICATIONS

This application claims priority to PCT/GB03/00442 filed Feb. 3, 2003 and Great Britain Patent Application Ser. No. 0202435.4, filed Feb. 2, 2002.

FIELD OF THE INVENTION

This invention concerns renewable energy resources.

BACKGROUND OF THE INVENTION

Wind energy has great potential as a renewable energy source. A recent report examining different renewable energy resources found that a total of 60 GW of cost effective renewable energy was available with the top two sources in terms potential being offshore wind (25 GW) and wave energy (14 GW). The next largest source of renewable energy is onshore wind (12 GW).

Currently wind power is used to generate electrical energy for the national grid. That requires large-scale commercial wind farms but they are expensive to set up due to the high cost of the turbines required.

SUMMARY OF THE INVENTION

An object of this invention is to provide an improved means of utilising wind power as a renewable energy source for generation of electrical power.

According to this invention it is proposed that individual properties be provided with means for generating electrical energy from wind power.

It is further proposed that electrical energy generated at an individual property be used in that property in preference to electrical energy provided by the national grid or other general electrical energy source.

It is alternatively proposed that electrical energy generated at an individual property be used to supplement electrical energy provided by the national grid or other general electrical energy source.

In other words, when there is sufficient wind power to generate electrical energy for an individual property's demands, that electrical energy be used rather than the electricity supplied by the national grid. In that way the drain on the resources of the national grid can be cut, so that national supply costs can also be reduced.

It is proposed that an individual property will have at least one turbine, such as a wind vane or vanes, mounted in a suitable position on the property exposed to the prevailing wind. The wind vane preferably comprises at least one multi-bladed rotor that drives an electricity generator. The wind vane or vanes are preferably arranged to rotate to face the wind to receive as much wind power as possible, such as by means of a tail fin. Rotation of the wind vanes is used to power a generator for producing electrical energy. The electrical energy generated is then selectively used for powering electrical equipment of the property. The electricity generator may be directly coupled to the rotor or may be spaced therefrom and connected thereto by a drive shaft, which may be a flexible drive shaft.

Because wind speeds vary, it is preferred that the wind vane has a governor, which is activated at a predetermined wind speed, such as at a wind speed of 25 mph, in order to maintain a substantially constant rpm value for the rotor even when the wind speed rises above the predetermined speed.

Again because of variable wind speeds, the electricity generation system of the invention preferably includes means for controlling and smoothing the power created into an acceptable wave into an inverter for the power to be transferred into the mains supply of the property.

The electricity generator for use in the invention preferably has a stator with skewed laminations, typically around 11.25°, in order to reduce or eliminate cogging and hence to reduce noise output. The generator used in the invention preferably uses neodymium magnets.

The property will in all probability be already connected to the national grid or other external mains electricity supply and an interface is preferably provided, whereby switching between the external electricity supply and the wind power generated supply can be achieved. Such switching may be arranged to operate as required or may be arranged to operate automatically when the electrical energy being supplied by the wind power reaches a predetermined threshold. The wind power generated electricity may be used to augment or replace the external mains supply. Indeed, it is preferable that the wind power generated electricity be used by the property in preference to the external mains supply.

Thus, it may be possible by means of the invention to reduce consumption of power from the national grid, which may lead to savings of other power sources, especially non-renewable sources. Furthermore, electricity costs for the domestic consumer can be reduced.

It is also envisaged according to a preferred embodiment of the invention that electrical power storage means be provided, whereby any excess electrical energy produced by wind power may be stored for later use, say when the prevailing wind speed drops to levels that do not produce any appreciable generation of electricity. For example, the electrical power generated according to the invention may be used to charge up storage batteries or the like to store electrical power for later use.

BRIEF DESCRIPTION OF THE DRAWINGS

This invention will now be further described, by way of example only, with reference to the accompanying drawings, in which:

FIG. 7 shows a front view of an array of turbines; and

FIG. 8 is a rear view of the array of FIG. 7.

DETAILED DESCRIPTION OF THE INVENTION

Figure 1:
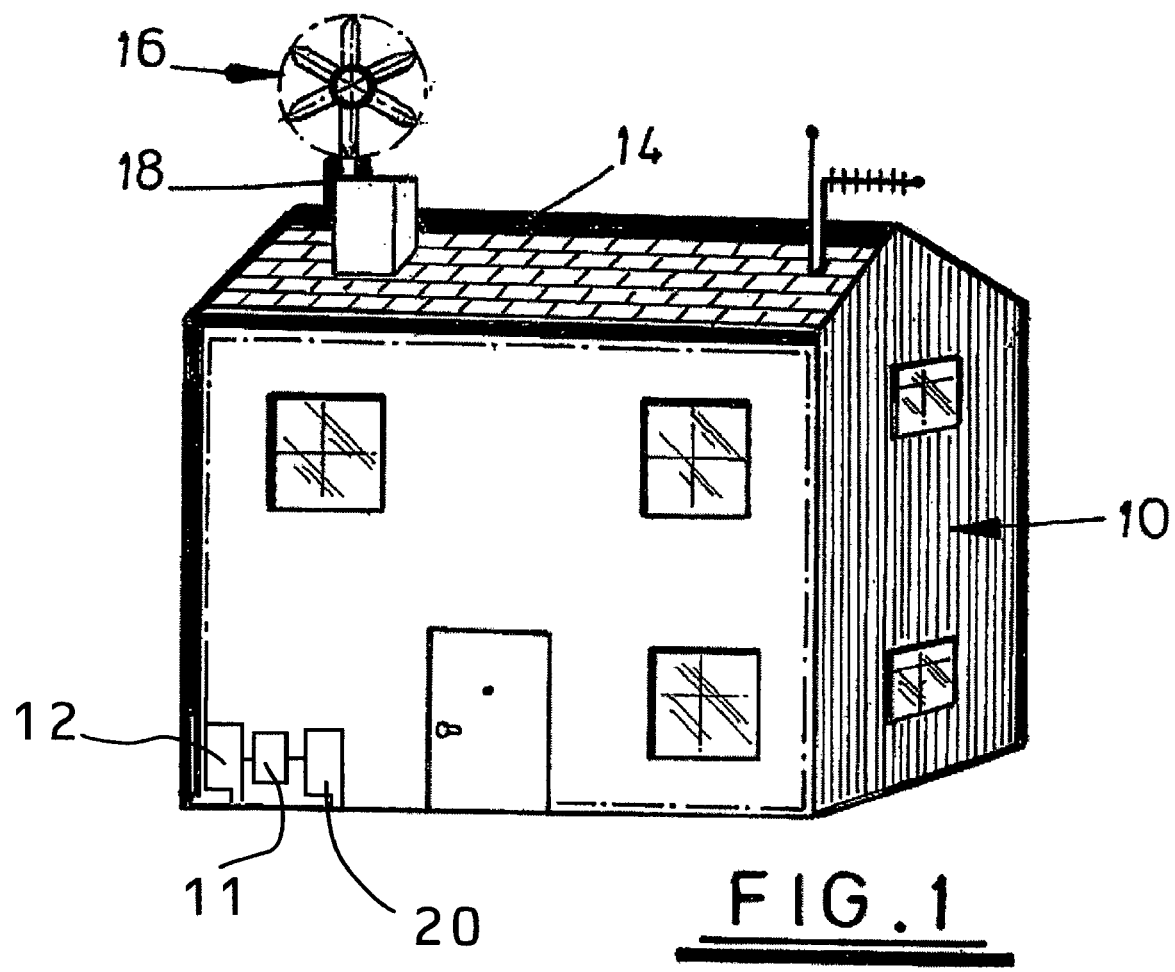
FIG. 1 shows schematically a wind powered electricity-generating system according to the invention.

Referring to FIG. 1 of the accompanying drawings, a property 10, such as a house, has a mains electricity supply 12 from an external source, such as from the national grid facilitated by a utility company. Mounted on the roof 14 of the property 10 is a turbine 16, in the form of a wind vane. Only one wind vane is shown but equally a group of wind vanes may be used. The turbine is arranged to face the direction of the prevailing wind to cause the blades of the turbines to rotate. The rotation of the turbine is used to power an electricity generator 18. The electricity generated by the generator is fed to a unit 20 that is coupled to mains electricity junction box within the property. Also included is an interface 11, whereby switching between the secondary electricity supply and the power generated by the electricity generator can be achieved.

The unit 20 has switching therein, whereby the electicity from the generator is used for the property in preference to the external mains electricity supply or to augment the external mains electricity supply. The unit may also be provided with means for storing residual electricity.

Thus, it is intended that the electricity supply for the property be generated by wind power whenever there is sufficient wind to produce it. When there is little or no wind, the external mains electricity supply will be used with the wind power generated electricity switching in to augment or replace it when there is sufficient wind power.

Figure 2:
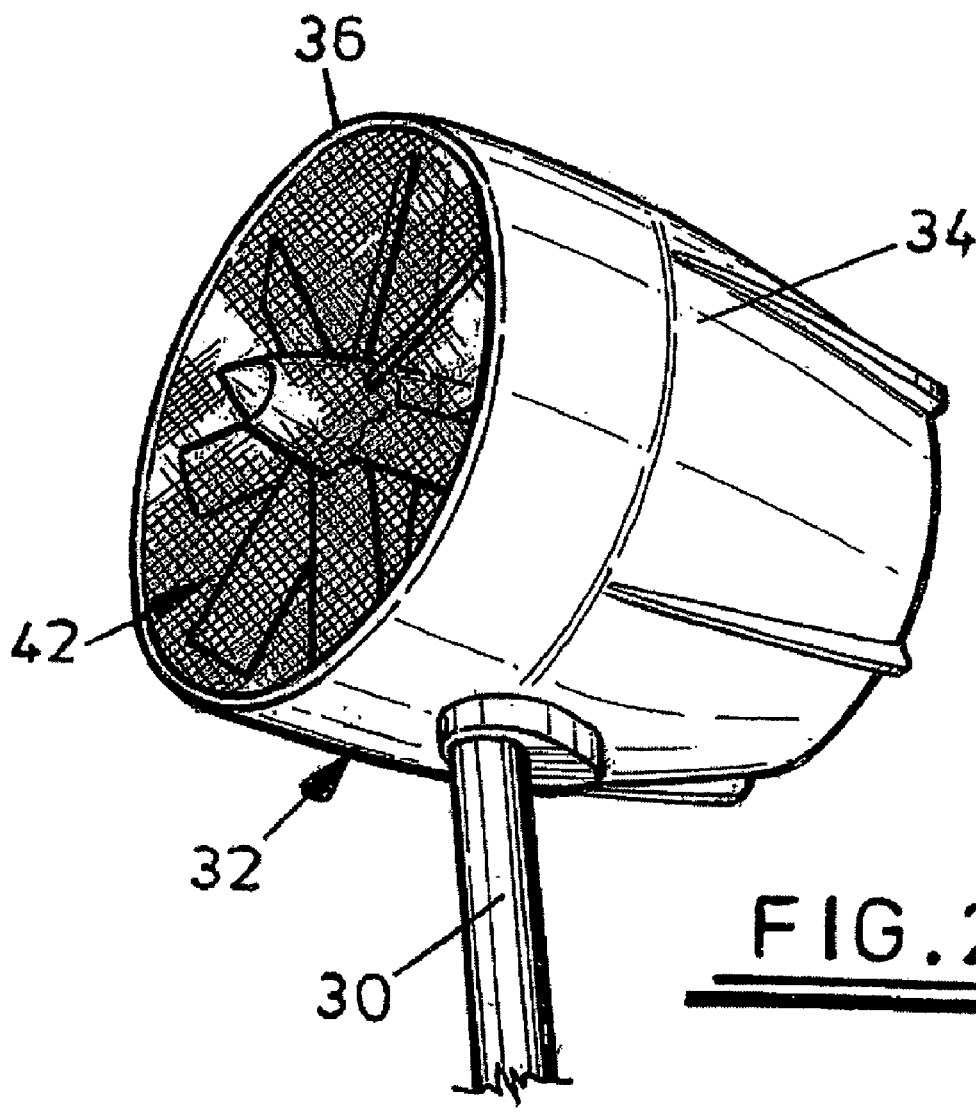
FIG. 2 is a side view of a wind powered turbine for use in the invention.
Figure 3:
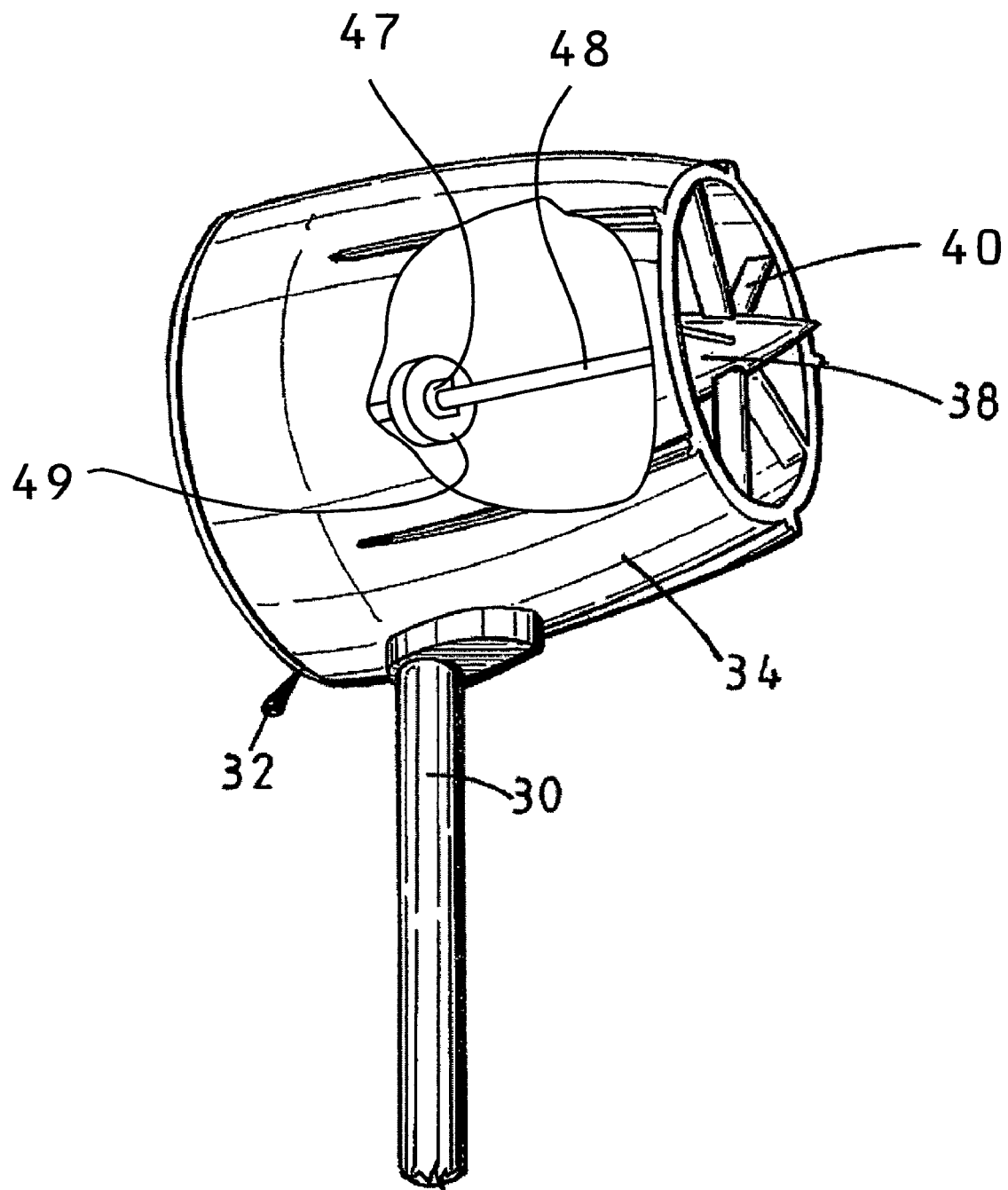
FIG. 3 is a partial cross section of the turbine of FIG. 2.

Turning to FIGS. 2 and 3 of the accompanying drawings, a wind-powered turbine that may be used in the arrangement of FIG. 1 comprises a post 30, on which is rotatably mounted a turbine 32. The turbine 32 has an aerodynamically shaped generally tapering cowl 34 containing a bladed rotor 36. The rotor 36 is arranged to be rotated by wind driving through the cowl and the rotor turns a shaft of an electrical power generator 38 within the cowl. The turbine has a governor 49, which is activated at a predetermined wind speed. The governor includes a sensor 47. The electricity generator is spaced from the rotor and connected thereto by a drive shaft, which may be a flexible drive shaft 48. The cowl is supported from the generator 35 by struts 40. The front of the cowl is covered by a mesh screen 42 to prevent damage from debris being blown into the cowl. Generated electrical power is transferred though cabling within or attached to the post 30.

Figure 4:
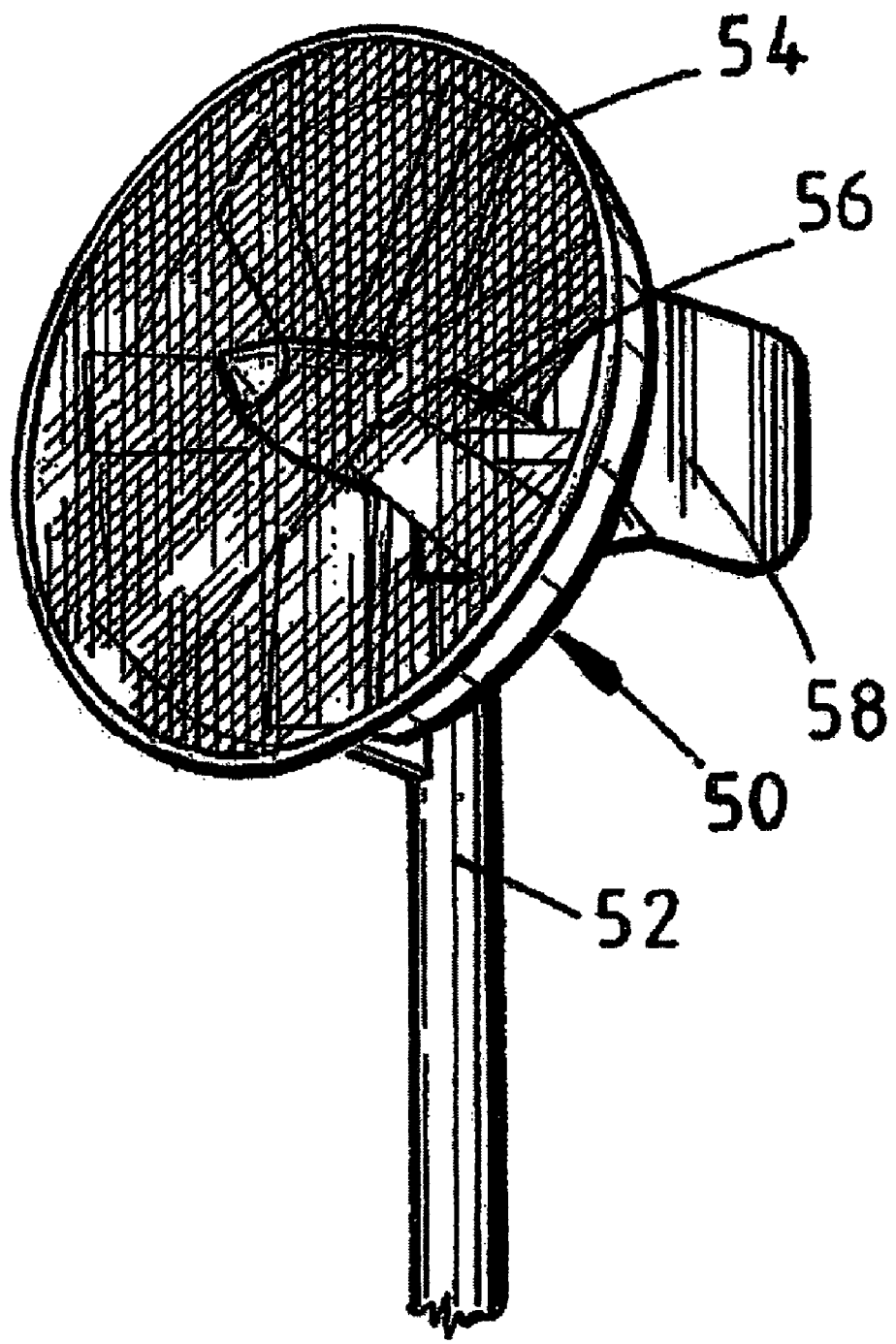
FIG. 4 is a front view of another wind powered turbine for use in the invention.
Figure 5:
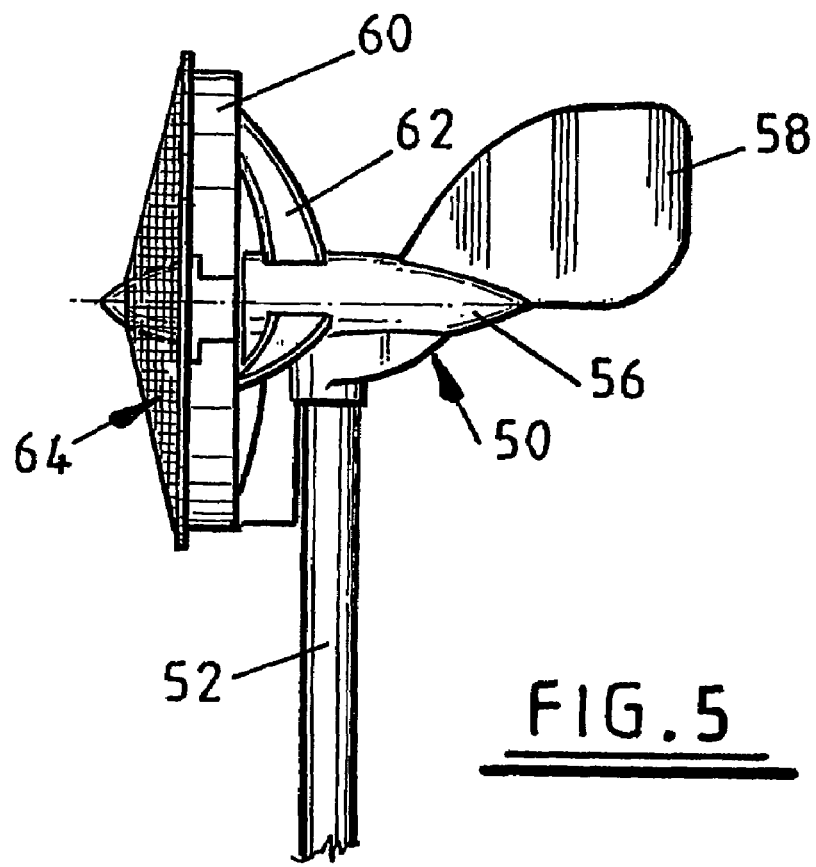
FIG. 5 is a side view of the turbine of FIG. 4.
Figure 6:
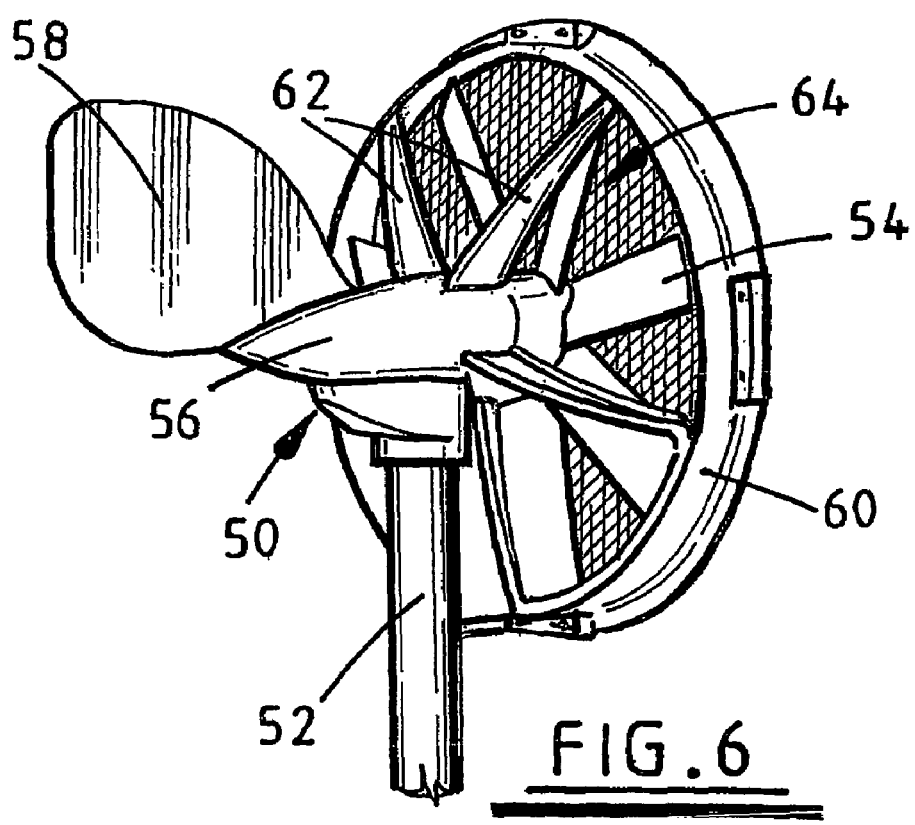
FIG. 6 is a rear view of the turbine of FIG. 4.

In FIGS. 4 to 6 of the drawings an alternative wind-powered turbine 50 for use in the invention is shown. The turbine 50 is rotatably mounted on a pole 52 and has a multi-bladed rotor 54 arranged to be rotated by the wind to rotate a shaft of an electrical power generator 56. The rotor is within the confines of a cowl 60 supported from the generator by struts 62. The turbine has a tail fin 58, in order to direct the rotor to be aligned with the wind direction. The cowl has a mesh screen 64 to protect the rotor from debris.

FIGS. 7 and 8 show how turbines 50 can be set in an array to increase power output. Typically such an array will be situated atop a building, such as an apartment block and can be made up of any number of individual turbines.

It is believed that significant cost savings may be achieved by means of the invention.

It is also envisaged that the system of the invention may be used to keep batteries charged up that are used for storing electrical power or that are used as backups for alarm systems and the like. Also, for properties having remote utility meter reading systems, such as by recording a meter reading by means of a digital camera and transmitting the recorded image to a remote location, the batteries used to power such systems may be kept charged by means of the invention.

The invention claimed is:

1. A system for generating electrical power for an individual property, said system comprising:
   a wind powered electricity generator and
   a turbine,
   said electricity generator mounted externally on a roof of that property and arranged so that the electrical power generated be used in that property in preference to electrical power provided by a secondary electrical energy source,
   said turbine having a bladed rotor being rotatable to be oriented facing into the wind,
   wherein said turbine is coupled to said electricity generator,
   whereby switching between the secondary electricity supply and the power generated by the wind powered electricity generator can be achieved,
   wherein such switching is arranged to operate automatically when the electrical enemy being supplied by the wind reaches a predetermined threshold.

2. A system as claimed in claim 1, wherein an individual property has at least one turbine mounted in a suitable position on the property exposed to the prevailing wind.

3. A system as claimed in claim 1, wherein the turbine comprises a wind vane.

4. A system as claimed in claim 3, wherein the wind vane has a tail fin.

5. A system as claimed in claim 1, wherein the electricity generator is mechanically coupled to the rotor.

6. A system as claimed in claim 1, wherein the electricity generator is spaced from the rotor and connected thereto by a drive shaft.

7. A system as claimed in claim 6, wherein the drive shaft is a flexible drive shaft.

8. A system as claimed in claim 3, wherein the wind vane has a governor, which is activated at a predetermined wind speed.

9. A system as claimed in claim 8, wherein the predetermined wind speed is 25 mph.

10. A system as claimed in claim 1 including electrical power storage means.

\* \* \* \* \*

UNITED STATES PATENT AND TRADEMARK OFFICE
CERTIFICATE OF CORRECTION

| | | |
|---|---|---|
| PATENT NO. | : 7,518,255 B2 | Page 1 of 1 |
| APPLICATION NO. | : 10/503565 | |
| DATED | : April 14, 2009 | |
| INVENTOR(S) | : David Hyman Gordon | |

It is certified that error appears in the above-identified patent and that said Letters Patent is hereby corrected as shown below:

In Column 3, line 33, "though" should be --through--.
In Column 4, line 25, "enemy" should be --energy--.

Signed and Sealed this

Second Day of June, 2009

JOHN DOLL
*Acting Director of the United States Patent and Trademark Office*